United States Patent
Meier et al.

(10) Patent No.: US 10,280,884 B2
(45) Date of Patent: May 7, 2019

(54) PUMP, IN PARTICULAR HIGH-PRESSURE FUEL PUMP

(71) Applicant: Robert Bosch GmbH, Stuttgart (DE)

(72) Inventors: Gerhard Meier, Schorndorf (DE); Markus Schetter, Bengaluru (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/528,010

(22) PCT Filed: Oct. 27, 2015

(86) PCT No.: PCT/EP2015/074874
§ 371 (c)(1),
(2) Date: May 18, 2017

(87) PCT Pub. No.: WO2016/078881
PCT Pub. Date: May 26, 2016

(65) Prior Publication Data
US 2017/0328322 A1 Nov. 16, 2017

(30) Foreign Application Priority Data
Nov. 21, 2014 (DE) .......... 10 2014 223 795

(51) Int. Cl.
*F02M 59/06* (2006.01)
*F02M 59/10* (2006.01)
(Continued)

(52) U.S. Cl.
CPC .......... *F02M 59/06* (2013.01); *F02M 59/102* (2013.01); *F02M 59/445* (2013.01);
(Continued)

(58) Field of Classification Search
CPC ........ F02M 59/06; F02M 59/102; F04B 1/04; F04B 1/0408; F04B 1/0417; F04B 1/0426; F04B 7/06; F04B 9/10
(Continued)

(56) References Cited

U.S. PATENT DOCUMENTS 4,008,009 A * 2/1977 Kovacs ................. F02M 59/14
417/387
4,465,445 A * 8/1984 Sommer ................. F04C 3/02
418/152

(Continued)

FOREIGN PATENT DOCUMENTS

DE 102004002487    8/2005
DE 102006038839 A1 2/2008
(Continued)

OTHER PUBLICATIONS

JP 2014043896 A English Translation Version.*
(Continued)

*Primary Examiner* — Hung Q Nguyen
*Assistant Examiner* — Johnny H Hoang
(74) *Attorney, Agent, or Firm* — Michael Best & Friedrich LLP

(57) ABSTRACT

Disclosed is a pump, in particular a high-pressure fuel pump, comprising at least one pump element (10) that has a roller tappet (20) inside which a roller (42) is rotatably mounted on a bearing bolt (44) by means of a bearing sleeve (46), said roller (42) rolling off a cam (22) of an input shaft (24). The bearing sleeve (46) is made of a plastic material, especially polyether ether ketone (PEEK) or polyphthalamide (PPA).

10 Claims, 2 Drawing Sheets

(51) Int. Cl.
*F04B 1/04* (2006.01)
*F02M 59/44* (2006.01)
*F16C 33/20* (2006.01)
*F02M 37/06* (2006.01)
*F04B 1/00* (2006.01)
*F16H 53/06* (2006.01)

(52) U.S. Cl.
CPC .......... *F04B 1/0408* (2013.01); *F04B 1/0417* (2013.01); *F04B 1/0426* (2013.01); *F16C 33/201* (2013.01); *F02M 37/06* (2013.01); *F02M 2200/02* (2013.01); *F02M 2200/9015* (2013.01); *F04B 1/00* (2013.01); *F05C 2225/00* (2013.01); *F05C 2225/12* (2013.01); *F16C 2208/02* (2013.01); *F16C 2208/58* (2013.01); *F16C 2360/42* (2013.01); *F16H 53/06* (2013.01)

(58) Field of Classification Search
USPC ........................................................ 123/495
See application file for complete search history.

(56) References Cited

U.S. PATENT DOCUMENTS

| | | | |
|---|---|---|---|
| 6,280,156 B1* | 8/2001 | Wirz | F04D 29/0465 |
| | | | 417/420 |
| 8,157,548 B2 | 4/2012 | Meier et al. | |
| 8,646,977 B2 | 2/2014 | Adam | |
| 2007/0183696 A1* | 8/2007 | Winterhalter | F16C 33/10 |
| | | | 384/100 |
| 2007/0223850 A1 | 9/2007 | Lopes et al. | |
| 2010/0288316 A1* | 11/2010 | Ertle | A47L 15/4225 |
| | | | 134/184 |
| 2011/0033320 A1* | 2/2011 | Heier | F04D 13/0606 |
| | | | 417/410.1 |

FOREIGN PATENT DOCUMENTS

| | | |
|---|---|---|
| DE | 102009002529 | 10/2010 |
| DE | 102010063363 | 6/2012 |
| DE | 102011075479 | 11/2012 |
| DE | 102011076859 | 12/2012 |
| JP | S617353 A | 1/1986 |
| JP | S61182935 A | 8/1986 |
| JP | H08217941 A | 8/1996 |
| JP | H08240220 A | 9/1996 |
| JP | 2002293275 A | 10/2002 |
| JP | 2003239976 A | 8/2003 |
| JP | 2005121223 A | 5/2005 |
| JP | 2007255712 A | 10/2007 |
| JP | 2008002522 A | 1/2008 |
| JP | 2012514171 A | 6/2012 |
| JP | 2012188954 A | 10/2012 |
| JP | 2014043896 A | 3/2014 |

OTHER PUBLICATIONS

International Search Report for Application No. PCT/EP2015/074874 dated Feb. 11, 2016 (English Translation, 2 pages).
"High-Performance Engineered Plastic Bearings", GGB EP Range catalog, GGB Bearing Technology, Publication Data Unknown—Based on the inclusion of a product introduction in 2016 (see p. 5), publication would appear to have been no earlier than Jan. 1, 2016, https://www.ggbearings.com/sites/default/files/atoms/files/ggb-ep-engineered-plastics-bearings-bushings-catalog-english.pdf, (32 pages).

* cited by examiner

PUMP, IN PARTICULAR HIGH-PRESSURE FUEL PUMP

BACKGROUND OF THE INVENTION

The invention proceeds from a pump, in particular a high-pressure fuel pump.

Such a pump in the form of a high-pressure fuel pump is disclosed by DE 10 2010 063 363 A1. This pump comprises a pump element having a roller tappet, via which a pump piston is supported on a cam of a drive shaft. In the roller tappet a roller, which bears on the cam, is rotatably supported on a bearing pin. The roller is supported on the bearing pin by way of a bearing bush. The bearing bush usually comprises a body composed of metal, in particular steel, which is provided with a coating of friction-bearing material. The highly accurate machining required and the application of the coating make manufacturing of the bearing bush very exacting. In addition, an uneven pressure distribution can occur in the bearing bush between this and the roller and/or the bearing pin, resulting in greater pressures in the edge areas of the bearing bush, so that increased wearing of the bearing bush occurs in these areas. The known steel bearing bushes have only poor emergency running characteristics in the event of inadequate lubrication, so that in this case heavy wearing of the bearing bush and/or the roller and/or the bearing pin can occur.

SUMMARY OF THE INVENTION

The pump according to the invention by contrast has the advantage that the bearing bush is easy to produce, and due to the greater elasticity of the plastic material compared to steel allows a more even pressure distribution.

Advantageous embodiments and developments of the pump according to the invention are specified in the dependent claims. Suitable plastic materials for the bearing bush are specified in the claims, as well as a development that allows good emergency running characteristics in the event of inadequate lubrication of the bearing bush, and an embodiment that facilitates manufacturing of the bearing bush.

BRIEF DESCRIPTION OF THE DRAWINGS

An exemplary embodiment of the invention is represented in the drawing and is explained in more detail in the following description.

DETAILED DESCRIPTION

Figure 1:
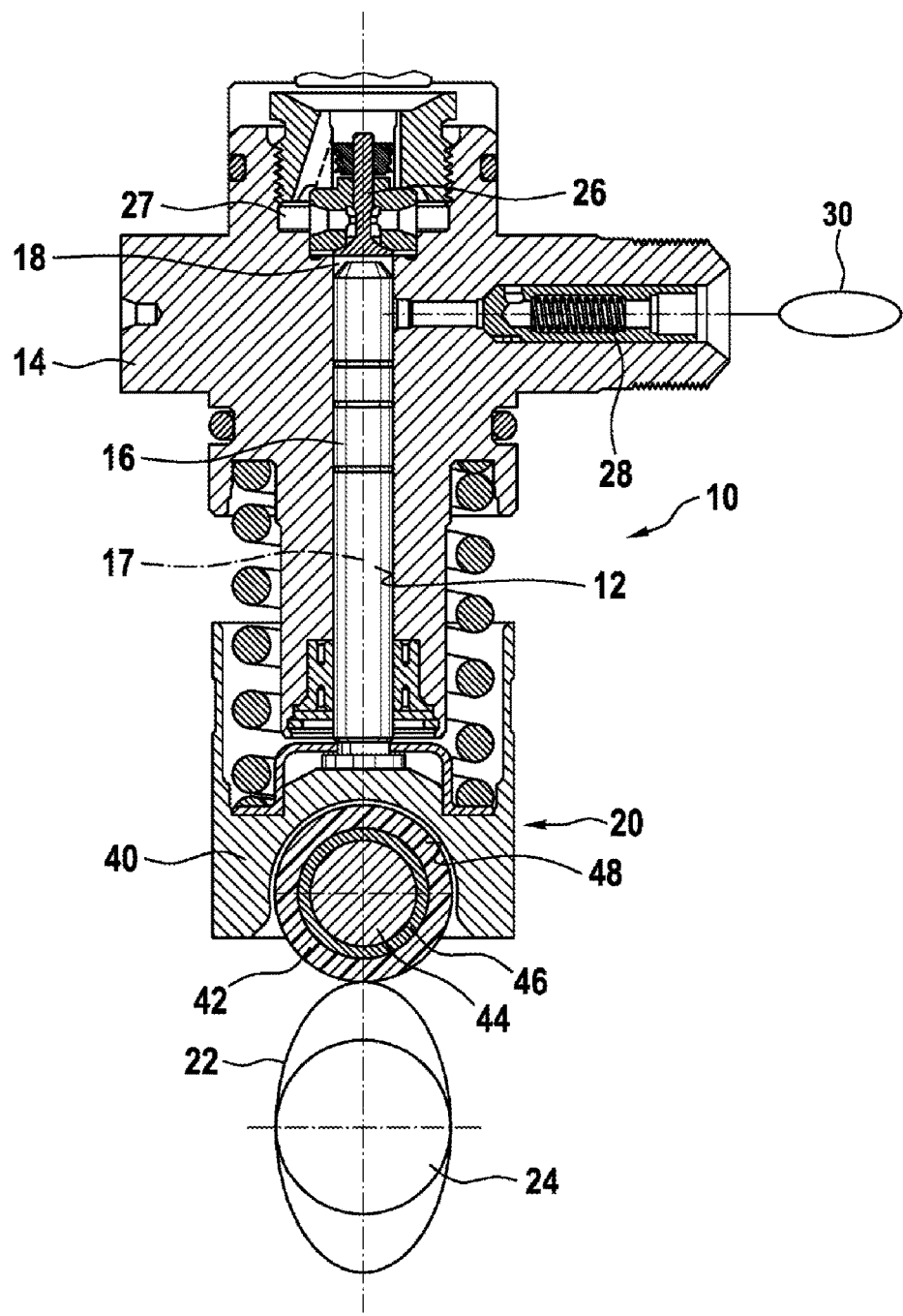
FIG. 1 shows a simplified representation of a pump in a longitudinal section.
Figure 2:
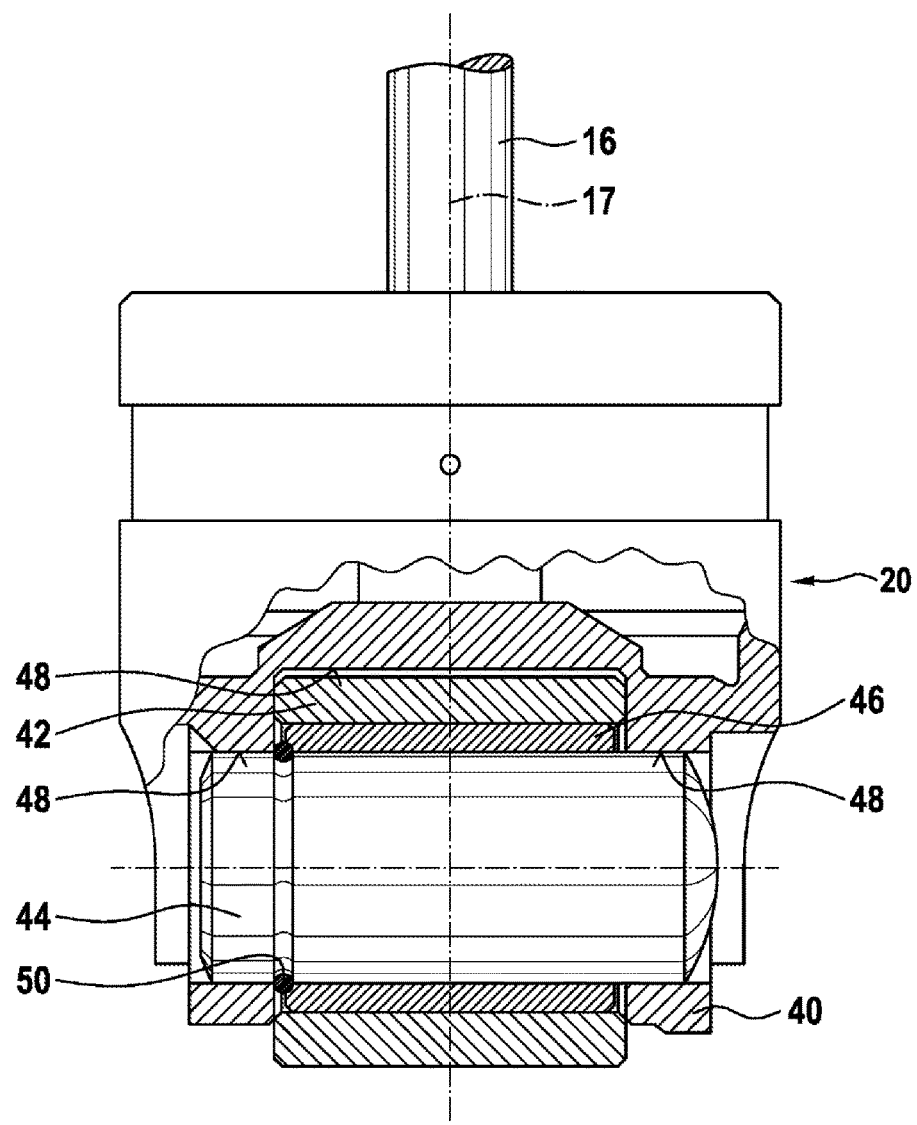
FIG. 2 shows an enlarged representation of a detail of a roller tappet of the pump.

FIG. 1 represents a pump, which is in particular a high-pressure fuel pump for a fuel injection device of an internal combustion engine. The pump comprises at least one pump element 10, which comprises a pump piston 16, displaceably and tightly guided in a cylinder bore 12 of a housing part 14, which is referred to hereinafter as a cylinder head. With its end projecting into the cylinder bore 12 the pump piston 16 defines a pump working chamber 18. The end of the pump piston 16 projecting from the cylinder bore 12 is connected to a roller tappet 20. The roller tappet 20 is supported on a cam 22 of a drive shaft 24, which cam under the rotational movement of the drive shaft 24 produces a reciprocating movement of the pump piston 16 in the cylinder bore 12. The drive shaft 24 may be part of the pump or part of the internal combustion engine, for example its camshaft or another shaft.

The pump working chamber 18 can be connected via an inlet valve 26 to a low-pressure inlet 27 to the pump and via an outlet valve 28 to a high-pressure outlet, which leads, for example, to a high-pressure accumulator 30. The low-pressure inlet 27 may be fed, for example, by a feed pump, which draws in fuel from a storage tank.

The roller tappet 20 comprises a hollow cylindrical tappet body 40, into which the end of the pump piston 16 protruding from the cylinder bore 12 projects on the side thereof remote from the cam 22. On the side of the tappet body 40 facing the cam 22 a roller 42, which rolls on the cam 22, is rotatably supported in said tappet body. A bearing pin 44, on which the roller 42 is rotatably supported by a bearing bush 46, is fixed in the tappet body 40. The tappet body 40 has a bore 48, which runs at least approximately perpendicular to the longitudinal axis 17 of the pump piston 16, wherein the diameter of the bore 48 is enlarged in its middle area, viewed in the longitudinal direction, and the bore 48 in its middle area is open to the cam 22. The bearing pin 44 may be pressed into the bore 48 at its end areas or may be secured in the bore 48 by means of a sprung retaining clip 50, for example, so that it cannot be pushed out of the bore 48 in the direction of its longitudinal axis.

The bearing bush 46 is of hollow cylindrical design and is arranged with a slight radial play on the middle area of the bearing pin 44. The hollow cylindrical roller 42 is supported with a slight radial play on the bearing bush 46. Here the roller 42 is arranged with its larger diameter in the middle area of the bore 48 and protrudes out through the open side of the middle area of the bore 48 towards the cam 22. The bearing bush 46 is produced from a plastic material, preferably from polyether ether ketone (PEEK) or from polyphthalamide (PPA). In addition, polyimide, polyamide imide or polyphenylene sulfide (PPS) may also be used as plastic material.

Fillers, which serve in particular to improve the emergency running characteristics of the bearing bush 46 in the event of inadequate lubrication, may be added to the plastic material. Carbon fibers, for example, and/or glass fibers and/or potassium titanate and/or polyaramid may be used as fillers. In addition, fillers which improve the anti-frictional characteristics of the bearing bush may be added to the plastic material. Solid lubricant particles, which may contain graphite, may be used as fillers for this purpose. Titanium dioxide and/or zinc sulfide and/or polytetrafluoroethylene may also be used as additives.

The bearing bush 46 is preferably produced by an injection molding method, wherein no further production operation, or at least only a machining of the inside and/or outside diameter of the bearing bush 46, is necessary following the injection molding process. Alternatively, the bearing bush 46 may also be produced by a method of pressing. In addition, the bearing bush 46 may also be produced from a bar material, from which portions of the required width are cut off.

What is claimed is:

1. A pump, having at least one pump element (10), which comprises a roller tappet (20), in which a roller (42), which rolls on a cam (22) of a drive shaft (24), is rotatably supported on a bearing pin (44) by a bearing bush (46), characterized in that the bearing bush (46) is made from a plastic material, wherein at least one filler is added to the plastic material of the bearing bush (46) to improve an emergency running characteristic of the bearing bush (46) in an event of inadequate lubrication.

2. The pump as claimed in claim 1, characterized in that the bearing bush (46) is made from polyether ether ketone (PEEK).

3. The pump as claimed in claim 1, characterized in that the bearing bush (46) is made from polyphthalamide (PPA).

4. The pump as claimed in claim 1, characterized in that the bearing bush (46) is made from polyphenylene sulfide (PPS).

5. The pump as claimed in claim 1, characterized in that the bearing bush (46) is made from polyimide or polyamide imide.

6. The pump as claimed in claim 1, characterized in that the at least one filler comprises at least one of carbon fibers, glass fibers, potassium titanate, polyaramid, titanium dioxide, zinc sulfide, graphite, or polytetrafluoroethylene.

7. The pump as claimed in claim 1, characterized in that the bearing bush (46) is produced by an injection molding method.

8. The pump as claimed in claim 1, characterized in that the bearing bush (46) is produced by a method of pressing.

9. The pump as claimed in claim 1, characterized in that the bearing bush (46) is produced as a portion of a bar material.

10. The pump as claimed in claim 1, wherein the pump is a high-pressure fuel pump.

* * * * *